United States Patent
Salonen

(10) Patent No.: US 7,768,946 B2
(45) Date of Patent: Aug. 3, 2010

(54) RESOURCE DETERMINATION IN IP-BASED NETWORKS

(75) Inventor: Jukka V. Salonen, Tampere (FI)

(73) Assignee: Nokia Corporation, Espoo (FI)

( * ) Notice: Subject to any disclaimer, the term of this patent is extended or adjusted under 35 U.S.C. 154(b) by 1231 days.

(21) Appl. No.: 10/456,786

(22) Filed: Jun. 9, 2003

(65) Prior Publication Data

US 2004/0196846 A1    Oct. 7, 2004

(30) Foreign Application Priority Data

Apr. 7, 2003    (EP)    ................................. 03008117

(51) Int. Cl.
*H04L 12/28*    (2006.01)
(52) U.S. Cl. ........................ 370/255; 370/401; 370/349; 370/395.31
(58) Field of Classification Search ................. 370/254, 370/229, 400–402, 389, 395.31, 395.32, 370/392, 395.52, 252, 346, 349, 399, 397, 370/395.2, 395.3; 709/224, 242
See application file for complete search history.

(56) References Cited

U.S. PATENT DOCUMENTS

| | | | | | |
|---|---|---|---|---|---|
| 5,185,860 | A | * | 2/1993 | Wu | ............................. 709/224 |
| 5,251,205 | A | * | 10/1993 | Callon et al. | ................. 370/392 |
| 5,473,599 | A | * | 12/1995 | Li et al. | ......................... 370/219 |
| 6,744,739 | B2 | * | 6/2004 | Martin | ......................... 370/254 |
| 7,200,122 | B2 | * | 4/2007 | Goringe et al. | ............. 370/255 |
| 2002/0027887 | A1 | | 3/2002 | Moriya | |
| 2002/0031107 | A1 | * | 3/2002 | Li et al. | ........................ 370/338 |
| 2002/0035641 | A1 | | 3/2002 | Kurose et al. | |
| 2002/0181394 | A1 | * | 12/2002 | Partain et al. | ................ 370/229 |
| 2003/0046427 | A1 | * | 3/2003 | Goringe et al. | ............. 709/242 |
| 2003/0099203 | A1 | * | 5/2003 | Rajan et al. | ................... 370/238 |
| 2003/0218988 | A1 | * | 11/2003 | Han et al. | ..................... 370/254 |
| 2004/0114569 | A1 | * | 6/2004 | Naden et al. | ................. 370/351 |
| 2005/1002505 | | * | 2/2005 | Rajan et al. | .................. 370/238 |
| 2005/0105475 | A1 | * | 5/2005 | Norrgard et al. | ............ 370/254 |

FOREIGN PATENT DOCUMENTS

WO    WO 02/21797    3/2002

OTHER PUBLICATIONS

European Search Report dated Mar. 5, 2007.

* cited by examiner

*Primary Examiner*—Brenda Pham
(74) *Attorney, Agent, or Firm*—Mintz, Levin, Cohn, Ferris, Glovsky and Popeo, P.C.

(57) ABSTRACT

The present invention relates to a method, system and router device for determining resources in an IP-based network, wherein a probe functionality is provided at a specific router device (90) located in a predetermined area (RA) of the IP-based network (50). When a link state change is detected in the specific router device (90), the probe functionality (P) forwards a list of router devices located in the predetermined area (RA) to a resource managing function which then requests at least one of a topology information and a link information from the router devices indicated in the list. Thereby, the resource information at the resource managing function can be kept updated at reduced signaling load and fast response times due to the fact that resource information is requested only from predetermined areas and at times of change.

18 Claims, 2 Drawing Sheets

RESOURCE DETERMINATION IN IP-BASED NETWORKS

FIELD OF THE INVENTION

The present invention relates to a method, system and router device for determining resources based on topology or link information in an IP-based network, such as for example an IP RAN (Internet Protocol Radio Access Network) or a RAN having an Iub over IP interface.

BACKGROUND OF THE INVENTION

The current networking trend is to provide IP-based connections all the way to wired and wireless units. Some current objectives are to simplify the infrastructure, to support a wide range of applications, and to support diverse user demands on the communication service. To allow this, there is a need for scaleable solutions supporting service differentiation and dynamic resource management in IP networks.

One design trade-off made to enable interconnection was to support only best-effort service at the network level and rely on endpoint functionality to obtain various levels of service. Best-effort service provides adequate support for traditional data applications that can tolerate delay, loss and varying throughput along the path. However, in networks carrying high loads of traffic, this type of service is often inadequate for meeting the demands of applications that are more sensitive to packet loss and delay, e.g. telephony, video on demand, multimedia conferencing, etc.

Another trend is that the link technologies used in IP networks are becoming more heterogeneous ranging from fiber optic backbone links to various kinds of wired and wireless link technologies at the edges. Wireless access technologies may incur bottlenecks at the edges of the network. One trend is that wireless access technologies for global-area licensed-bands, e.g. GSM (Global System for Mobile communication), GPRS (General Packet Radio Services), UMTS (Universal Mobile Telecommunications System), are migrating from being purely connection-oriented towards applying IP all the way. These networks will be relatively resource-constrained compared with the wired IP networks. Hand-units in these networks traditionally provide real-time applications for human interaction, e.g. voice, but they are now migrating to providing multiple applications.

All these trends point towards the Internet becoming a ubiquitous multi-service network. Consequently, there are strong commercial reasons for network operators and equipment providers to offer Quality-of-Service (QoS) differentiation in IP networks. There will be a migration from the current version four of IP (IPv4) to version six (IPv6) to obtain more IP addresses and other additional functionality as well. The need for solutions providing QoS differentiation still prevails.

Qualitative services, better than best-effort services, can be provided by relying on Diffserv (Differentiated Services) support in routers and resource management mechanisms. Diffserv provides a moderate level of quality differentiation without strict guarantees. The distinctive technical characteristic is that QoS is not attained by reserving capacity for each individual flow or connection, but marking packets at the network boundaries. Thus, Diffserv refers to a simple service structure which provides quality differentiation mainly by means of packet marking. To provide quantitative service, resources must be dynamically administrated by resource management mechanisms and involve dynamic admission control to make sure that there are sufficient resources in the network to provide the services committed. There are specific requirements for resource management mechanisms. To provide service to end users, they must detect network resources and schedule them for the committed service at any granularity, e.g. for a port range, for aggregate traffic between a pair of subnets, etc. In order to keep both QoS and utilization high, aggregate level resource control is needed. The performance must also be sufficient to handle mobility and frequent handover.

IP RAN is a new radio access network platform based on IP transport technology. It supports interfaces towards core networks (CNs) and legacy RANs as well as legacy terminals. Furthermore, interfaces for GERAN (GPRS/EDGE RAN) and UTRAN (UMTS Terrestrial RAN) are supported.

Here, the term "legacy" is used to indicate those formats, applications, data or devices, which have been inherited from languages, platforms, and techniques earlier than the current technology. Typically, the challenge is to keep the legacy features or applications running while converting it to newer, more efficient features that make use of new technology and skills.

In IP RAN, most of the functions of centralized controllers, i.e. Radio Network Controllers (RNC) and Base Station Controllers (BSC) are moved to the base station. In particular, all the radio interface protocols are terminated in the base station. Thus, entities outside the base stations are needed to perform common configuration and some radio resource functions, or interworking with legacy functions, gateways to the CN, at least to support legacy CNs, and micro-mobility anchor points.

Furthermore, an IP Transport Resource Manager (ITRM) functionality is provided for managing IP resources in the bandwidth limited access part of the IP RAN by collecting load information of routers and by providing available bandwidth limits for the new IP Base Transceiver Stations (IP BTSs) and/or admission control entities. The major targets of the ITRM functionality are to provide overload protection functionality, to make QoS of IP RAN access transport less dependent on dimensioning and upgrading, and to increase robustness against link layer changes effecting transport capacity.

In order to perform the above-mentioned function, the ITRM functionality needs to know the network resources, e.g. IP topology and/or IP link capacities, of the managed part of the transport network. The managed part may be a subset of routing areas within an anonymous system. Especially, information about topology changes need to be received as fast as possible in order to minimize transport QoS problems for example during link failures.

Document U.S. Pat. No. 5,185,860 discloses mechanism of discovering network elements, or nodes connected to a computer network. Some nodes on the network, called discovery agents, convey knowledge of the existence of other nodes on the network. The network discovery system queries these agents and obtains the information they have about other nodes on the network. It then queries each of the other nodes obtained to determine if said node is also a discovery agent. In this manner, most of the nodes of a network can be discovered. The process of querying discovery agents to obtain a list of nodes known to the discovery agents is repeated at predetermined intervals to obtain information about nodes that are not always active. This known iterative method is continued as long as needed to get the entire topology and link information of the routing area. Hence, this procedure is slow and leads to an increased signaling load on the network links due to continuous queries.

Furthermore, a functionality has been proposed, which learns the network topology by listening to protocol messages and reports them to the ITRM functionality. However, this functionality will miss static route configurations which are hard to catch. Moreover, it requires complex router solutions and is strongly dependent on the used routing protocol.

SUMMARY OF THE INVENTION

It is therefore an object of the present invention to provide a method and system for resource determination in an IP-based network, by means of which information about current topology and topology changes can be provided in a fast manner at reduced signaling load.

This object is achieved by a method of determining resources in an IP-based network, said method comprising the steps of:

providing a probe functionality at a router device located in a predetermined area of said IP-based network;

receiving a list of router devices located in said predetermined area, said list being generated by said probe functionality in response to a detected change of a link state at said router device; and requesting at least one of a topology information and a link information from said router devices indicated in said list.

Furthermore, the above object is achieved by a router device for an IP-based network, said router device comprising:

a detector unit for detecting a change in a link state information provided at said router device; and a probe function for transmitting a list of router devices located in a predetermined area, in response to a detected change in said link state information.

Additionally, the above object is achieved by a system for determining resources in an IP-based network, said system comprising a router device as defined above, and a resource managing device having a receiver unit for receiving said router list, and a polling unit for polling at least one of a topology information and a link information from said router devices indicated in said router list.

Accordingly, a very simple concept of gathering resource information is provided which is easy to support. The trigger for signaling the router lists is generated at the probe functionality of a specific router device and limits the amount of routers to be checked. Furthermore, static routing entries are included in this resource or topology discovery which is only little dependent on the routing protocol and thus provides the possibility of supporting more than one routing protocol with little extra work. Signaling load can be kept low due to the fact that the discovery method is active only after a change in the network.

The topology information may comprise at least a subset of routing tables and the link information may comprise link capacities of the listed router devices. The subset of routing tables may include all network links at the respective one of said listed routers.

Furthermore, the IP-based network may be a cellular radio access network, such as an IP RAN.

The router list may be received together with an area identification of the predetermined area. Specifically, the predetermined area may be a routing area.

The list of router devices may comprise router identities of the listed router devices. These router identities may then be mapped to IP addresses used in said requesting step.

The link state information monitored at the router device may be stored in a link state database. The probe function at the router device may be configured to transmit a router list together with the area identification of the predetermined area. The router device may be any probe capable router.

Furthermore, means may be provided for deactivating the probe function. Thereby, the probe function may be deactivated and a probe function at another router device may be activated in case of any partial network failures.

Further advantageous modifications are defined in the dependent claims.

BRIEF DESCRIPTION OF THE DRAWINGS

In the following, the present invention will be described on the basis of a preferred embodiment with reference to the accompanying drawings, in which.

DESCRIPTION OF THE PREFERRED EMBODIMENT

The preferred embodiment will now be described based on an IP RAN architecture.

Figure 1:
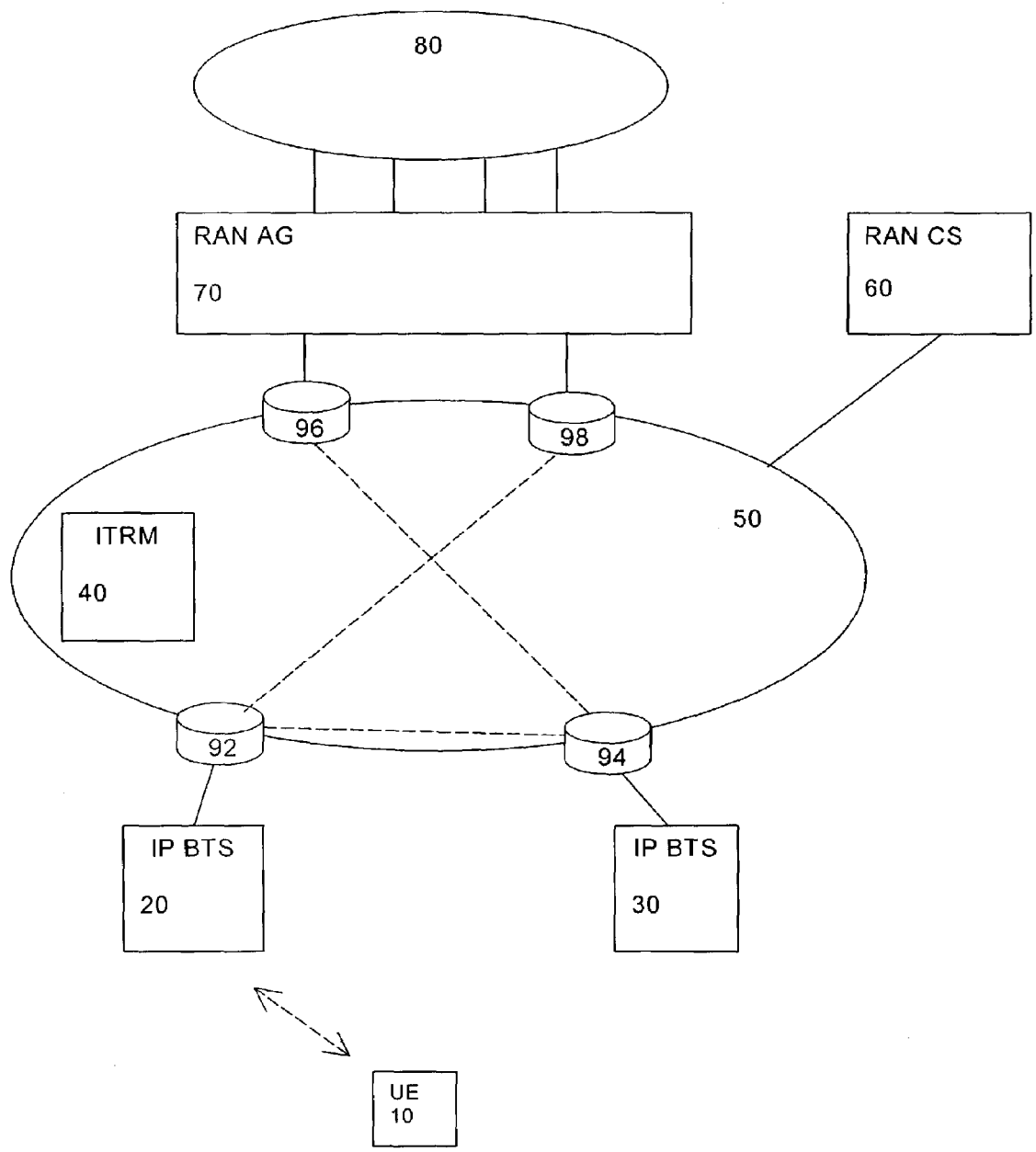
FIG. 1 shows a schematic representation of an IP RAN architecture in which the present invention can be implemented.

FIG. 1 shows a schematic representation of the IP RAN architecture according to the preferred embodiment. The IP RAN architecture comprises IP BTSs 20, 30 which correspond to base station devices of cellular networks and which in addition to the usual L1 processing functionality also include a functionality for processing radio protocols. The IP BTSs 20, 30 can be regarded as a combination of an RNC function and a BSC function, wherein the control plane traffic is connected via an Iu like interface towards an RAN Access Server (RNAS) functionality. Furthermore, Iur like interfaces are provided towards other IP BTSs. The IP BTSs 20, 30 are connected via an IPv6 network 50 to RAN access gateways (RAN AG) 70 which comprise the RNAS functionality, a RAN gateway (RNGW) functionality and a circuit-switched gateway (CSGW) functionality and which constitute the access point to the IP RAN from at least one core network (CN) 80 and other RANs (not shown).

Furthermore, an RAN common server (RAN CS) functionality 60 is provided which comprise a Common Radio Resource Manager Server (CRMS), an Operations & Maintenance Server (OMS) and a Serving Mobile Location Center (SMLC) to perform RAN-wide functionality that cannot be located at the BTS sides. The RAN CS functionality 60 is connected via the IPv6 network 50 to the IP BTSs 20, 30 and to the RAN AG 70.

The CSGW acts as a micro-mobility anchor point for circuit switched interfaces to GSM and GPRS networks. Furthermore, the CSGW is also used as an interworking unit for the connection to the ATM (Asynchronous Transfer Mode) based UTRAN.

The RNGW functionality is the IP user plane access point from the CN 80 or other RANs to the IP RAN. During a radio access bearer assignment procedure, the IP RAN returns to the CN 80 transport addresses owned by the RNGW, where the user plane shall be terminated. Packet-switched Iu interfaces are connected through the RNGW functionality. Main function of the RNGW functionality is the micro-mobility anchor, i.e. the user plane switching during the BTS relocation/handover, in order to hide the mobility to the CN 80. The RNAS functionality acts as a signaling gateway between IP RAN and the CN 80.

In the RAN CS 60, the OMS is responsible for configuration management, performance monitoring, fault management and logical operations and management. Furthermore, the CRMS acts as a policy decision point for the access to the cells and radio bearer resources within the IP RAN, by performing radio resource management algorithms based on dynamic status information of cells that do not belong to the same IP BTS. The CRMS is also connected to other radio access networks than IP RAN, allowing dynamic intersystem radio resource management. Finally, the SLMC performs mobile station positioning functions in the IP RAN. It is used to locate terminal devices or user equipments (UE) 10 of users connected via packet and circuit-switched Iu interfaces and A interfaces.

In the IPv6 network 50 an ITRM 40 is provided for performing resource management functions within the IPv6 network 50. In FIG. 1, the IP BTSs 20, 30 are connected via respective edge routers 92, 94 to the IPv6 network 50 and the RAN AG 70 are connected via edge routers 96, 98 to the IPv6 network 50. The data packets transmitted via the IPv6 network 50 are routed by the edge routers 92, 94, 96, 98 to core routers (not shown) within the IPv6 network 50 using a corresponding routing protocol.

In order to transfer data packets from a sending device to a destination device, the network layer must determine the path or route which the data packets are to follow. This is achieved by the network layer routing protocol. At the heart of any routing protocol an algorithm, i.e. the routing algorithm, determines the path for a packet. The purpose of the routing algorithm is to find a preferred path from source to destination.

In the preferred embodiment, the routing path is determined based on link-state databases provided at the router devices of the IPv6 network 50. The link state database provides information about the availability, capacity, distance and/or other link parameters between router devices of the IPv6 network 50.

According to the Open Shortest Path First (OSPF) routing protocol, which is a link-state protocol, flooding of link-state information and a least-cost-path algorithm are used for determining the preferred routing path. With the OSPF protocol, a router device constructs a complete topological map of its own routing area. The router device then locally runs a shortest-paths algorithm to determine a shortest-path tree to all networks with itself as the route node. The routers routing table is then obtained from this shortest-path tree. Individual link costs are then configured by the network administrator.

An OSPF autonomous system can be configured in two areas, wherein each area runs its own OSPF link-state routing algorithm, with each router in an area broadcasting its link state to all other routers in that area. The internal details of an area thus remain invisible to all routers outside the area. Within each area, one or more area border routers are responsible for routing data packets outside the area. Inter-area routing within the system requires that the data packet be first routed to an area border router, then routed through a backbone area to an area border router of the destination area, where the data packet is routed to the final destination.

According to the preferred embodiment, one topology probe is provided in the IPv6 network 50 per routing area, e.g. OSPF routing area or IS-IS (Intermediate System to Intermediate System Protocol) routing area or subset thereof. The topology probe is provided as an additional functionality within a selected router device, e.g. an RAR router or an IRIS router, which can be activated or deactivated by the ITRM 40.

Figure 2:
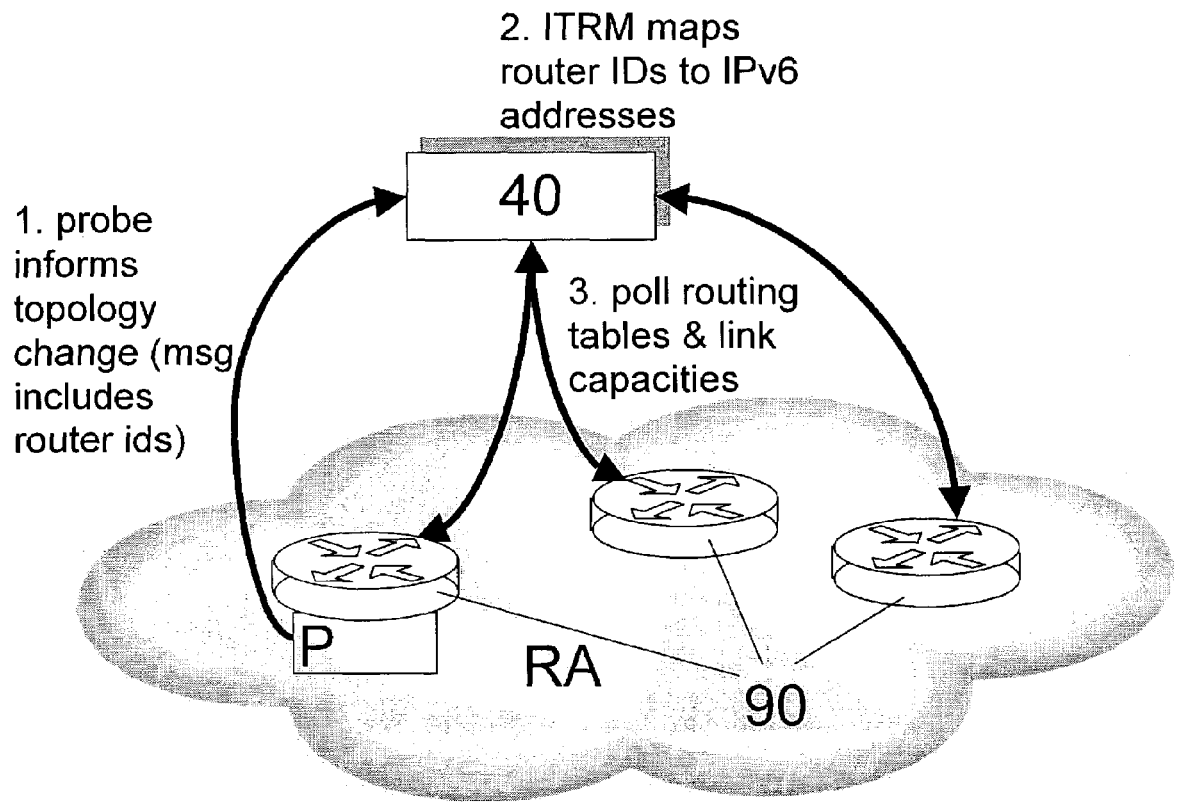
FIG. 2 shows a schematic diagram indicating the resource determination mechanism according the preferred embodiment.

FIG. 2 shows a schematic diagram indicating a routing area RA and router devices 90 provided in the routing area RA. Furthermore, a probe functionality P is provided at the left one of the router devices 90 shown in FIG. 2. This topology probe functionality P provides a router list of the routing area (RA) to the ITRM 40, when a change of the link state is detected at the selected router device where the active topology probe functionality P is located.

In step 1 of FIG. 2, the probe functionality P informs a detected topology change by generating and forwarding a message which includes router identities (IDs) of the router devices 90 located in the routing area RA to the ITRM 40. The ITRM 40 maps the received router IDs to IPv6 addresses and uses these Internet addresses to poll routing tables and/or link capacities from each router device of the routing area RA as identified by the received router IDs (step 3).

Thereby, the resource information required for resource management at the ITRM 40 can be kept updated at little delay and low signaling load. Due to the fact that the signaling of router IDs is only performed upon detection of a topology change by the topology probe functionality P, the collection of routing tables and/or link capacities is restricted to those routing areas at times where a topology change has been detected.

Figure 3:
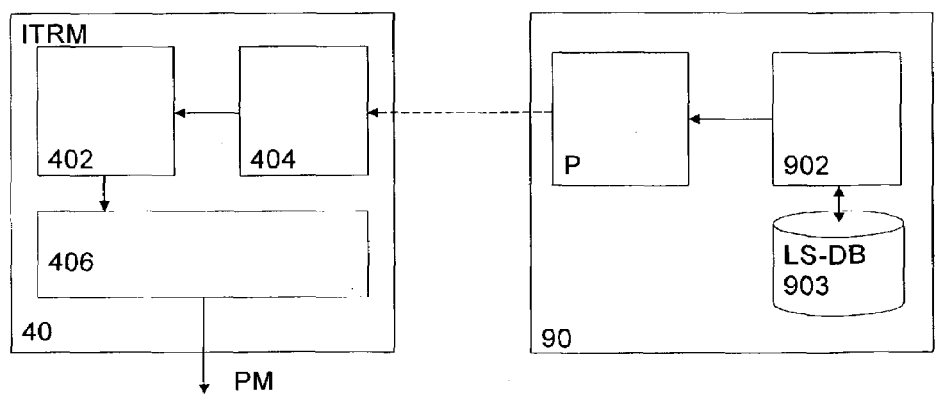
FIG. 3 shows a schematic block diagram of a router device with a probe functionality and a resource managing functionality according to the preferred embodiment.

FIG. 3 shows a schematic block diagram of the selected router device 90 with the topology probe functionality P, and the ITRM 40.

At the selected router device 90, a monitoring or detecting unit 902 is provided which monitors the content of a link state database 903 provided at the router device 90. Upon detection of a change in the link state, the detection unit 902 informs the topology probe functionality P which generates a corresponding signaling message comprising a list of router IDs of the routing area RA in FIG. 2. Optionally, an area identification of the routing area RA in FIG. 2 may be included in the signaling message to identify the concerned routing area RA in FIG. 2.

Then, the topology probe functionality forwards the signaling message with a list of router IDs and optional area identification to a receiver unit 404 or input port at the ITRM 40. The receiver unit 404 supplies the received router IDs of the router list to an address translation function 402, where the router IDs are translated or mapped to IPv6 addresses. The address translation function 402 depends on the used routing protocol and its version. The address translation function may be performed on the basis of additional information obtained from a Network Management Subsystem (NMS) planning tool (not shown).

At a polling or output unit 406 of the ITRM 40, the probe information and IPv6 router mapping information is combined and used for polling a subset of routing tables, which subset includes all links of the routing area RA, and/or link capacities from each router device 90 located in the routing area RA.

At least one probe-capable router device 90 should be provided in the predetermined routing area RA. All router devices not necessarily need to be probecapable. For example, third party router devices may not be probe-capable. However, the system should be adapted to provide relevant routing table and/or link capacity information from all router devices within the routing area RA, including probe-capable and non-probe-capable router devices.

Optionally, a deactivating or disabling functionality (not shown) may be provided at the selected router device 90, by means of which the probe functionality P can be de-activated and re-activated again, e.g. based on a corresponding control signaling received from the ITRM 40 or based on a local software- or hardware-based input or switching function. For example, if a first part of the routing area RA becomes unreachable due to a link failure and the active probe functionality P is located in the first part, then a probe-capable router device with an inactive probe status, located in a second part of the routing area RA, which is still reachable, can be activated in order to be able to obtain topology change messages from the second part.

The proposed topology and link determination procedure ensures that the resource information, e.g. IP-topology and IP-link capacities, of the managed part of the IPv6 network 50 in FIG. 1 is kept up-to-date at low signaling load and reduced response times.

The managed part may be a subset of an OSPF routing area within an anonymous system. The proposed solution is based on a very simple concept which provides easy support of new network elements and simple processing at the topology probe functionality P or the ITRM 40. Other future routing protocols can easily be supported due to little modifications required. The probe functionality P may be implemented in any probe-capable routers suitable to implement the probe functionality P. The functionality of the ITRM 40 can be implemented in an IP Radio Controller (IPRC), while the signaling between the ITRM 40 and the router devices 90 may be based on a Command Line Interface (CLI) or a Simple Network Management Protocol (SNMP) communication. The router device 90 may support the IETF specifications RFC 2465 and RFC 2873, relating to the processing of IPv4 precedence fields and a Management Information Base (MIB) for IPv6.

It is noted that the present invention is not restricted to the above preferred embodiments but can be implemented in any IP-base network where topology information or link information is required at a resource managing function. In particular, the present invention is not restricted to the specific devices of the IP RAN architecture. The preferred embodiment may thus vary within the scope of the attached claims.

The invention claimed is:

1. A method comprising:
providing a topological probe functionality at a router device located in a routing area of an internet protocol based network, said topology probe functionality being provided by a topological probe function at said router device;
detecting a change of a link state at said router device, said change being detected by a detector unit at said router device;
receiving a list of router devices located in said routing area, said list being generated and transmitted by said topological probe functionality in response to the detected change; and
requesting at least one of a subset of routing tables and link capacities from said router devices indicated in said list, generated and transmitted by said topological probe functionality in response to said detected change.

2. A method according to claim 1, wherein said subset of routing tables includes all network links at a respective one of said listed routers.

3. A method according to claim 1, wherein said internet protocol based network is a cellular radio access network.

4. A method according to claim 1, wherein said router list is received together with an area identification of said router area.

5. A method according to claim 1, wherein said list of router devices comprises router identities of said listed router devices.

6. A method according to claim 5, further comprising:
mapping said router identities to internet protocol addresses used in said requesting at least one of the subset of routing tables and the link capacities.

7. A system comprising:
a detector configured to detect a change in a link state information provided at a router device;
a topological probe function configured to generate and transmit a list of router devices located in a routing area, in response to a detected change in said link state information;
a receiver configured to receive said router list; and
a polling unit configured to poll at least one of a subset of routing tables and link capacities from said router devices indicated in said router list.

8. A system according to claim 7, wherein said link state information is stored in a link state database.

9. A system according to claim 7, wherein said topological probe function is configured to transmit said router list together with an area identification of said routing area.

10. A system according to claim 7, wherein said router list comprises router identities of said listed router devices.

11. A system according to claim 7, further comprising a deactivator configured to deactivate said topological probe function.

12. A system comprising:
a router device comprising a detector configured to detect a change in a link state information provided at said router device and a topological probe function configured to generate and transmit a list of router devices located in a routing area, in response to a detected change in said link state information;
a resource manager comprising a receiver configured to receive said router list; and
a polling unit configured to poll at least one of a subset of routing tables and link capacities from said router devices indicated in said router list.

13. A system comprising:
detecting means for detecting a change in a link state information provided at a router device;
topological probe functionality means for generating and transmitting a list of router devices located in a routing area, in response to the detected change in said link state information;
receiving means for receiving said router list; and
polling means for polling at least one of a subset of routing tables and link capacities from said router devices indicated in said router list.

14. A system according to claim 13 wherein said link state information is stored in a link state database.

15. A system according to claim 13, wherein said topological probe functionality means transmits said router list together with an area identification of said routing area.

16. A system according to claim 13, wherein said router list comprises router identities of said listed router devices.

17. A system according to claim 13, further comprising deactivating means for deactivating said topological probe functionality means.

18. A system comprising:
routing means comprising detecting means for detecting a change in a link state information provided at a router device and topological probe functionality means for generating and transmitting a list of router devices located in a routing area, in response to the detected change in said link state information; and resource managing means comprising receiving means for receiving said router list and polling means for polling at least one of a subset of routing tables and link capacities from said router devices indicated in said router list.

* * * * *